(12) United States Patent
Paschedag et al.

(10) Patent No.: US 10,454,393 B2
(45) Date of Patent: Oct. 22, 2019

(54) BALANCING CURRENT WITHIN A PARALLEL MODULAR CONVERTER SYSTEM

(71) Applicant: THE BOEING COMPANY, Chicago, IL (US)

(72) Inventors: Darren Lee Paschedag, St. Louis, MO (US); Lijun Gao, Renton, WA (US); Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/219,028

(22) Filed: Jul. 25, 2016

(65) Prior Publication Data

US 2018/0026557 A1    Jan. 25, 2018

(51) Int. Cl.

| | |
|---|---|
| *H02P 5/505* | (2016.01) |
| *H02P 27/08* | (2006.01) |
| *H02M 1/44* | (2007.01) |
| *H02M 7/537* | (2006.01) |
| *H02M 1/088* | (2006.01) |
| *H02M 7/493* | (2007.01) |
| H02M 1/00 | (2006.01) |

(52) U.S. Cl.
CPC ............ *H02P 5/505* (2016.02); *H02M 1/088* (2013.01); *H02M 1/44* (2013.01); *H02M 7/493* (2013.01); *H02M 7/537* (2013.01); *H02P 27/08* (2013.01); *H02M 2001/0009* (2013.01); *H02M 2001/0025* (2013.01)

(58) Field of Classification Search
USPC .......................... 318/4, 5, 8, 400.02, 400.03
See application file for complete search history.

(56) References Cited

U.S. PATENT DOCUMENTS 5,991,173 A * 11/1999 Nishikawa .............. H02M 7/49
                                                                                                      363/37
2007/0259545 A1    11/2007 Berenger
(Continued)

FOREIGN PATENT DOCUMENTS

| DE | 4105868 A1 | 9/1991 |
|---|---|---|
| EP | 0409226 A2 | 1/1991 |
| EP | 2763260 A2 | 8/2014 |
| JP | 04325893 A * | 11/1992 |
| WO | 2014025734 A2 | 2/2014 |

OTHER PUBLICATIONS

Extended European Search Report for Application No. 17169273. 4-1809 dated Jul. 12, 2017.
(Continued)

*Primary Examiner* — Jorge L Carrasquillo
(74) *Attorney, Agent, or Firm* — Patterson + Sheridan, LLP

(57) ABSTRACT

A current balancing system, and associated method and computer-readable medium are disclosed herein. The current balancing system comprises a plurality of power inverters, each power inverter included within a respective current loop and configured to generate a corresponding current amount. The current balancing system further comprises a plurality of inverter controllers, each inverter controller associated with a respective one of the plurality of power inverters and configured to receive a reference frame-transformed amount of the corresponding current amount. Each inverter controller is capable of independently controlling the corresponding current amount provided to a load.

20 Claims, 6 Drawing Sheets

(56) References Cited

U.S. PATENT DOCUMENTS

| | | | |
|---|---|---|---|
| 2008/0073135 A1* | 3/2008 | Oyobe | B60K 6/365 322/17 |
| 2009/0033252 A1* | 2/2009 | Smith | B60L 11/1868 318/139 |
| 2011/0103110 A1* | 5/2011 | Godridge | H02J 3/386 363/74 |
| 2011/0156623 A1* | 6/2011 | Nakamura | H02P 5/74 318/400.02 |
| 2016/0094030 A1 | 3/2016 | Gao et al. | |
| 2016/0094039 A1 | 3/2016 | Winstanley et al. | |
| 2016/0094040 A1 | 3/2016 | Krolak et al. | |
| 2016/0204726 A1* | 7/2016 | Mori | H02P 21/22 318/400.02 |
| 2016/0261205 A1* | 9/2016 | Kolar | H02M 5/458 |
| 2017/0264232 A1* | 9/2017 | Iezawa | H02P 29/032 |
| 2017/0288594 A1* | 10/2017 | Kasahara | H02P 21/24 |

OTHER PUBLICATIONS

Wei Yongqing et al: "Control of parallel inverters based on CAN bus in large-capacity motor drives", Electric Utility Deregulation and Restructuring and Power Technologies, 2008. DRPT 2008. Third International Conference on, IEEE, Piscataway, NJ, USA, Apr. 6, 2008 (Apr. 6, 2008), pp. 1375-1379.

Daniel Fingas et al: "Operation of parallel three-phase converters as a motor drive", IECON 2009—35th Annual Conference of IEEE D2 Industrial Electronics (IECON 2009)—Nov. 3-5, 2009—Porto, Portugal, IEEE, Piscataway, NJ, USA, Nov. 3, 2009 (Nov. 3, 2009), pp. 1217-1222.

\* cited by examiner

BALANCING CURRENT WITHIN A PARALLEL MODULAR CONVERTER SYSTEM

CROSS-REFERENCE TO RELATED APPLICATIONS

This application is related to the following published patent applications: number US20160094039 entitled "Parallel Modular Converter Architecture", number US20160094030 entitled "EMI Filter Systems and Methods For Parallel Modular Converters", and number US20160094040 entitled "Systems and Methods for Reducing Circulating Current and Phase-to-Phase Imbalance in a Parallel Modular Convertor System". Each of these applications is herein incorporated by reference in their entirety.

FIELD

The present disclosure relates generally to power management, and more specifically, to balancing current between parallel inverters within a modular converter architecture.

BACKGROUND

Modern vehicles use a large number of electronics, motors, heaters, and other electrically-driven equipment. Electric motors, in particular, are ubiquitous in modern vehicles, including aircraft, and drive everything from hydraulic pumps to cabin fans. Conventionally, each of these electric motors is driven by an independent motor controller. Each motor controller is sized to be able to carry the maximum amount of current required to power its respective motor at full power for an extended period of time (and generally, further includes some additional capacity for safety) without overheating or malfunctioning.

As a result, each aircraft carries a number of motor controllers, each of which may be oversized and underutilized a majority of the time. In other words, the motor controller includes enough capacity to run the motor at full power for an extended period of time plus a safety margin, but motors are rarely, if ever, run at full capacity. This is because the motors themselves have some safety margin built in and because, a majority of the time, the motors are operating in a lower demand regime (e.g., the cabin fan is not always on "High"). In addition, some motors are only used occasionally, or during specific flight segments, and are unused the remainder of the time. As a result, many of an aircraft's complement of heavy, expensive motor controllers spend a majority of their service life either inactive or operating significantly below their rated power outputs.

SUMMARY

One embodiment described herein is a current balancing system comprising a plurality of power inverters, each power inverter included within a respective current loop and configured to generate a corresponding current amount. The current balancing system further comprises a plurality of inverter controllers, each inverter controller associated with a respective one of the plurality of power inverters and configured to receive a reference frame-transformed amount of the corresponding current amount. Each inverter controller is capable of independently controlling the corresponding current amount provided to a load.

Another embodiment described herein is a method of controlling current production of a plurality of power inverters controlled by a plurality of inverter controllers. The method comprises determining a plurality of current amounts, each of the plurality of current amounts produced by a respective one of the plurality of power inverters. The method further comprises transforming a reference frame of each of the plurality of current amounts to produce a plurality of transformed current amounts, and generating, based on the plurality of transformed current amounts received by the plurality of inverter controllers, gate commands for the plurality of power inverters. The application of the generated gate commands operates to adjust at least one of the plurality of current amounts to thereby mitigate a current imbalance between at least two of the plurality of power inverters.

Another embodiment provides a non-transitory computer-readable medium comprising computer program code that, when executed by operation of one or more computer processors, performs an operation of controlling current production of a plurality of power inverters controlled by a plurality of inverter controllers. The operation comprises determining a plurality of current amounts, each of the plurality of current amounts produced by a respective one of the plurality of power inverters. The operation further comprises transforming a reference frame of each of the plurality of current amounts to produce a plurality of transformed current amounts, and generating, based on the plurality of transformed current amounts received by the plurality of inverter controllers, gate commands for the plurality of power inverters. The application of the generated gate commands operates to adjust at least one of the plurality of current amounts to thereby mitigate a current imbalance between at least two of the plurality of inverters.

The features, functions, and advantages that have been discussed may be achieved independently in various embodiments or may be combined in yet other embodiments, further details of which can be seen with reference to the following description and drawings.

BRIEF DESCRIPTION OF ILLUSTRATIONS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
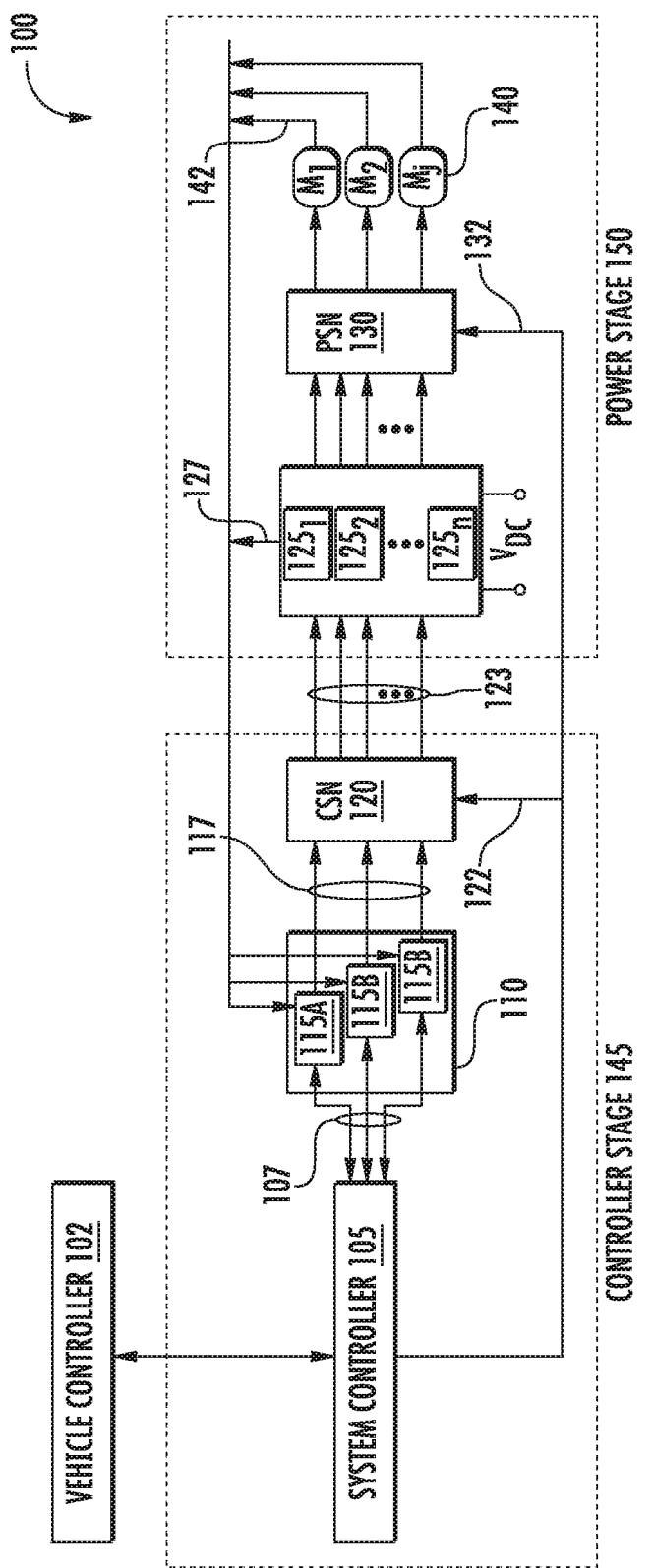
FIG. 1 illustrates a parallel modular converter system, according to one or more embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

To better utilize motor controller capacity, a modular converter system can provide multiple, modular, assignable, dynamically reconfigurable motor controllers that can work alone or in parallel with other parallel motor controllers to meet power control needs. The converter system connects one or more controllers, connected in parallel, to each active electrical load in the aircraft, as necessary, to meet existing power demands. Increasing utilization of motor controllers can provide a corresponding reduction in system weight and cost.

During operation the modular converter system, a plurality of paralleled inverters can operate in parallel to power an electric motor or other electrical load(s). However, the loading of the paralleled inverters can vary due to manufacturing tolerances and variations of the inverters, as well as parasitic elements caused by wiring resistance and inductance and/or other connected components. As a result, driving the paralleled inverters with the same drive signals can result in uneven loading. While the current from each of the paralleled inverters can be balanced using inductors at the outputs, these inductors tend to be unsuitably large and lossy when used within high-power applications.

To provide current balancing between paralleled first and second inverter units of a modular converter system, a current balancing system comprises a plurality of power inverters, wherein each power inverter is included within a respective current loop and configured to generate a corresponding current amount. The current balancing system further comprises a plurality of inverter controllers, wherein each inverter controller is associated with a respective one of the plurality of power inverters. Each inverter controller is configured to receive a reference frame-transformed amount of the corresponding current amount, whereby each inverter controller is capable of independently controlling the corresponding current amount provided to a load.

In some embodiments, to provide current balancing a system controller of the current balancing system determines a plurality of current amounts, each of the plurality of current amounts produced by a respective one of the plurality of power inverters. The system controller transforms a reference frame of each of the plurality of current amounts to produce a plurality of transformed current amounts, and generates, based on the plurality of transformed current amounts received by the plurality of inverter controllers, gate commands for the plurality of power inverters. The generated gate commands operate to mitigate a current imbalance between at least two of the plurality of inverters.

Referring to FIG. 1, a parallel modular converter system 100 (also referred to as "modular converter system," "converter system," "system") is configured to control a system of parallel modular inverters $125_1$, $125_2$, ..., $125_n$ (also referred to as "inverter modules," "inverter units," "power inverters," "inverters"; generically inverters 125) to drive multiple and/or different types of alternating current (AC) or direct current (DC) machines, such as the depicted loads 140 (i.e., motors $M_1$, $M_2$, ..., $M_j$). The parallel modular converter system 100 comprises the plurality of inverters 125 that are connected in parallel, each of which is able to be configured to receive any of a plurality of motor control algorithms 115A, 115B, 115C (also "control algorithms," "algorithms") embedded in a motor control system 110 via a reconfigurable control switching network (CSN) 120. The motor control system 110 may comprise one or more motor controller circuits, each of which is configured to operate one or more motors 140. Each of the parallel modular inverters 125 can be configured to drive one or more of the plurality of electrical loads 140 (e.g., AC or DC machines such as motors $M_1$, $M_2$, ..., $M_j$), on the load side via a reconfigurable power switching network (PSN) 130. In some embodiments, each of the parallel modular inverters 125 provides a single phase of output power to the electrical loads 140. In other embodiments, each of the parallel modular inverters 125 provides multiple phases of output power (e.g., three-phase AC) to the electrical loads 140. For example, an inverter 125 may include three phase legs that are each configured to provide a separate phase output of a three-phase signal to drive selected electrical loads 140.

The illustrated configuration enables, for example, the ability to dynamically reconfigure both the control switching network 120 and the power switching network 130. In addition, any of the inverters from the plurality of inverters 125 is accessible to drive any one of the electrical loads 140 on the load side, and any control algorithm of a plurality of control algorithms 115A, 115B, 115C embedded in the motor control system 110 is accessible to control any of the plurality of inverters 125. As a result, one or more inverters 125 may be configured to drive a single load 140 as necessary to meet load requirements, and/or to drive a plurality of loads 140 at the same time, each of which can be driven using one or more inverters 125. In addition, a plurality of loads 140 on the load side can be driven at the same time with the same motor control algorithm (e.g., 115A) or different motor control algorithms (e.g., some with motor control algorithm 115A, some with motor control algorithm 115B).

As shown in FIG. 1, the parallel modular converter system 100 comprises a system controller 105 configured to communicate with a vehicle controller 102 to obtain operational commands from the vehicle controller 102 and to provide status signals related to operation of the modular converter system 100 and/or other information to the vehicle controller 102. In some embodiments, the system controller 105 can also reconfigure the power switching network 130 to provide an appropriate number of inverter modules 125 in parallel to drive a particular load 140 in real time. In other words, when the loading of a load 140 is increased, the system controller 105 can signal the power switching network 130 to place more inverters 125 in parallel. Conversely, when loading is decreased, the system controller 105 can signal the power switching network 130 to disengage one or more of the inverters 125. If necessary, the system controller 105 can then place them in parallel with other inverters 125 to drive other loads 140.

In some embodiments, the system controller 105 can also reconfigure the control switching network 120 using CSN control signals 122 to provide appropriate motor control algorithms 115A, 115B, 115C as motor control signals 117 to one or more of the inverters 125 driving one or more motor types. The inverters 125 may further provide feedback signals 127, such as current and/or voltage values, to the motor control system 110 and the selected motor control algorithm 115A, 115B, 115C. Some non-limiting examples of motor control algorithms 115A, 115B, 115C provided by system controller 105 include field-oriented control (FOC), direct torque control (DTC), and voltage over frequency control (V/f). Different motor control algorithms can be useful to efficiently drive the various motor types of the associated vehicle (e.g., induction motors, synchronous motors, permanent magnet (PM) synchronous motors, brushless DC motors, etc.). For example, a typical aircraft can include a starter motor-generator for the main engines (a PM-type motor), a ram-air fan (induction motor), an environmental control system (ECS) compressor motor (PM-type motor), and one or more synchronous motors, all of which may have different power requirements.

In some embodiments, the system controller 105 can also send, for example and not limitation, motor speed, torque, or power reference values to corresponding loads 140 (e.g., via the motor control system 110). In some embodiments, the system controller 105 can be stored and run on an embedded controller. The system controller 105 can comprise, for example and not limitation, a microcontroller, processor, field-programmable gate array (FPGA), or application-specific integrated circuit (ASIC). In some embodiments, the system controller 105 can use a real-time simulator/emulator or can be run in real-time.

In some embodiments, the number of motor controller algorithms 115A, 115B, 115C can be determined by the number of different motor loads. For example, if the system 100 has three different types of motors 140 to drive, then three motor controller algorithms 115A, 115B, 115C can be developed, with each motor control algorithm 115A, 115B, 115C specific to the motor 140. In another example, if three loads 140 perform the same function, it is possible that all three loads can be powered using a single motor control algorithm 115A, 115B, or 115C.

The control switching network 120 can dynamically configure one or more inverters 125, each of which can be driven by a specific control algorithm 115A, 115B, 115C, or a common control algorithm 115A, 115B, 115C, which is routed through control switching network 120 according to CSN control signals 122 provided by the system controller 105. In some embodiments, a time delay between signals into and out of control switching network 120 can be minimized to improve motor drive performance.

The control switching network 120 can have a software-based or hardware-based implementation. In some embodiments, a software-coded control switching network 120 can be run on, for example and not limitation, an embedded controller, real-time simulator, or computer. In other embodiments, the control switching network 120 can be implemented using a hardware device such as, for example and not limitation, complex programmable logic devices (CPLDs), ASICs, or FPGAs.

In some embodiments, the power switching network 130 can be dynamically configured, using PSN control signals 132 from the system controller 105, to connect one or more inverters 125 to drive one or more loads 140 per one or more specific control algorithms 115A, 115B, 115C from the motor control system 110. In some embodiments, the power switching network 130 can act as a short circuit and/or over-current protection device. In this case, power switch(es) of the PSN 130 that are associated with the short circuited or over-current load 140 open when a fault is detected.

The power switching network 130 can be implemented using power switches, some non-limiting examples of which including solid state relays, mechanical relays, transistors, and other controllable power switches. The system controller 105 controls each power switch using the PSN control signals 132. The inverters 125 convert DC power (i.e., $V_{DC}$ in FIG. 1) to the requested AC power output (e.g., with different voltage levels, frequencies, waveforms, etc.) to drive various AC machines (e.g., loads 140) according to the selected motor algorithm 115A, 115B, 115C with system controller 105. The inverters 125 can comprise, for example and not limitation, insulated-gate bipolar transistors (IGBTs), metal-oxide-semiconductor field-effect transistors (MOSFETs), and bipolar junction transistors (BJTs).

The control switching network 120 includes sufficient numbers of control switches so that each motor control algorithm 115A, 115B, 115C can be selectively and dynamically connected with any one or more of the inverters 125. However, in other embodiments, certain combinations of inverters 125 and motor control algorithms 115A, 115B, 115C may be omitted as being not required, which can reduce the number of control switches included in control switching network 120. In some cases, a particular motor load is preferably controlled by a specific motor control algorithm 115A, 115B, 115C. For example, an induction motor driving a fan may prefer a V/f control algorithm in order to reduce computational duty. The power switches of PSN 132 that would route other motor control algorithms 115A, 115B, 115C to this motor are not necessary, and may be omitted for simplicity. The power switching network 130 includes sufficient numbers of power switches so that each of the inverters 125 can be selectively and dynamically connected with any one or more of the electrical loads 140 (i.e., motors $M_1, M_2, \ldots, M_j$). Similarly, in other embodiments, certain combinations of inverters 125 and electrical loads 140 may be omitted to reduce the number of power switches included in power switching network 130. In one non-limiting example, system 100 includes three (3) motor control algorithms 115A-115C, three (3) loads 140, and five (5) inverters 125. In this case, fifteen (15) control switches are included in CSN 120 (corresponding to three motor control algorithms 115 and five inverters 125) and fifteen (15) power switches are included in PSN 130 (corresponding to the five inverters 125 and three loads 140), but these numbers may vary based on the implementation. For example, the number n of paralleled inverters 125 may be any suitable number. Consequently, the dimension of the control switching network 120 in this example will be (3×n), and the dimension of the power switching network 130 will be (n×3). Similarly, the number of loads 140 may be more than three, e.g., a number j. Consequently, the dimension of the power switching network 130 will be (n×j).

In some embodiments, the modular converter system 100 is divided into a plurality of stages. As shown, the modular converter system 100 includes a controller stage 145 and a power stage 150. The components within the controller stage 145 (e.g., system controller 105, motor control system 110) can be operated within a different power supply regime than the components within power stage 150. For example, the controller stage 145 may be powered at a relatively low voltage (e.g., between about 1 volt (V) and 20 V) that is suitable for operating the controller stage 145 components, while the power stage 150 is powered with relatively higher voltages (e.g., between about 100 V to 1000 V or more) suitable for producing the output power required to drive the loads 140. Furthermore, in some embodiments, the power stage 150 is configured to provide a power output having multiple phases (e.g., a three-phase AC output) for driving the loads 140. In such embodiments, each connection between inverters 125, power switching network 130, and loads 140 may represent a three-phase power connection. By separating the components of the modular converter system 100 into multiple stages, the components of controller stage 145 need not be dimensioned to handle the higher voltages and/or currents of the power stage 150. As a result, the controller stage 145 may generally include smaller and/or less lossy components, reducing the weight and improving the efficiency of the modular converter system 100.

Control signals and/or feedback signals communicated between the controller stage 145 and power stage 150 may cross an isolation barrier configured to prevent the higher voltages (e.g., large DC voltages) of the power stage 150 from affecting the lower-voltage components of the controller stage 145. As shown, the system controller 105 communicates control signals 107 with the motor control system 110 to select particular motor control algorithms 115. The motor control system 110 provides selected algorithm(s) as motor control signals 117 that are transmitted via selected path(s) within the control switching network 120 and delivered as control signals 123 to the inverters 125. The loads 140 provide one or more motor feedback signals 142 to the motor control algorithms 115 for updated control. Some non-limiting examples of motor feedback signals 142 include current, voltage, speed, and position values.

In still other embodiments, the modular converter system 100 can assign loads 140 based on a load priority factor. In other words, if, for example, the number of loads 140 requested by external aircraft systems (i.e., by vehicle controller 102) is larger than can be provided by the modular converter system 100, the modular converter system 100 can assign loads by a load priority factor, with higher-priority loads 140 being powered before lower-priority loads 140. If the aircraft (through vehicle controller 102) makes a request for a relatively large load, e.g., for lowering a landing gear, the system 100 can temporarily reassign some or all of the inverters 125 to power the load(s) 140 associated with the landing gear. When the landing gear is down and locked, in turn, the modular converter system 100 can reassign the inverters 125 to their previous loads 140 (or to new existing loads). For example, the cabin fan can be temporarily deactivated in favor of lowering the landing gear, and the cabin fan is restarted when the landing gear is down.

In some embodiments, such as when there are an excess of low-priority loads 140 that collectively exceed the power rating of the modular converter system 100, the modular converter system 100 may power some or all of the loads 140 at a reduced setting. In this manner, all loads 140 are powered, but may operate at a lower speed or capacity. So, for example, the aircraft cabin fans, lighting, and entertainment system may request power at the same time in excess of the modular converter system 100 rating. As a result, the modular converter system 100 can, for example, provide full power to the entertainment system, but slightly reduce cabin fan speeds and lighting intensity to reduce overall power demand.

Figure 2:
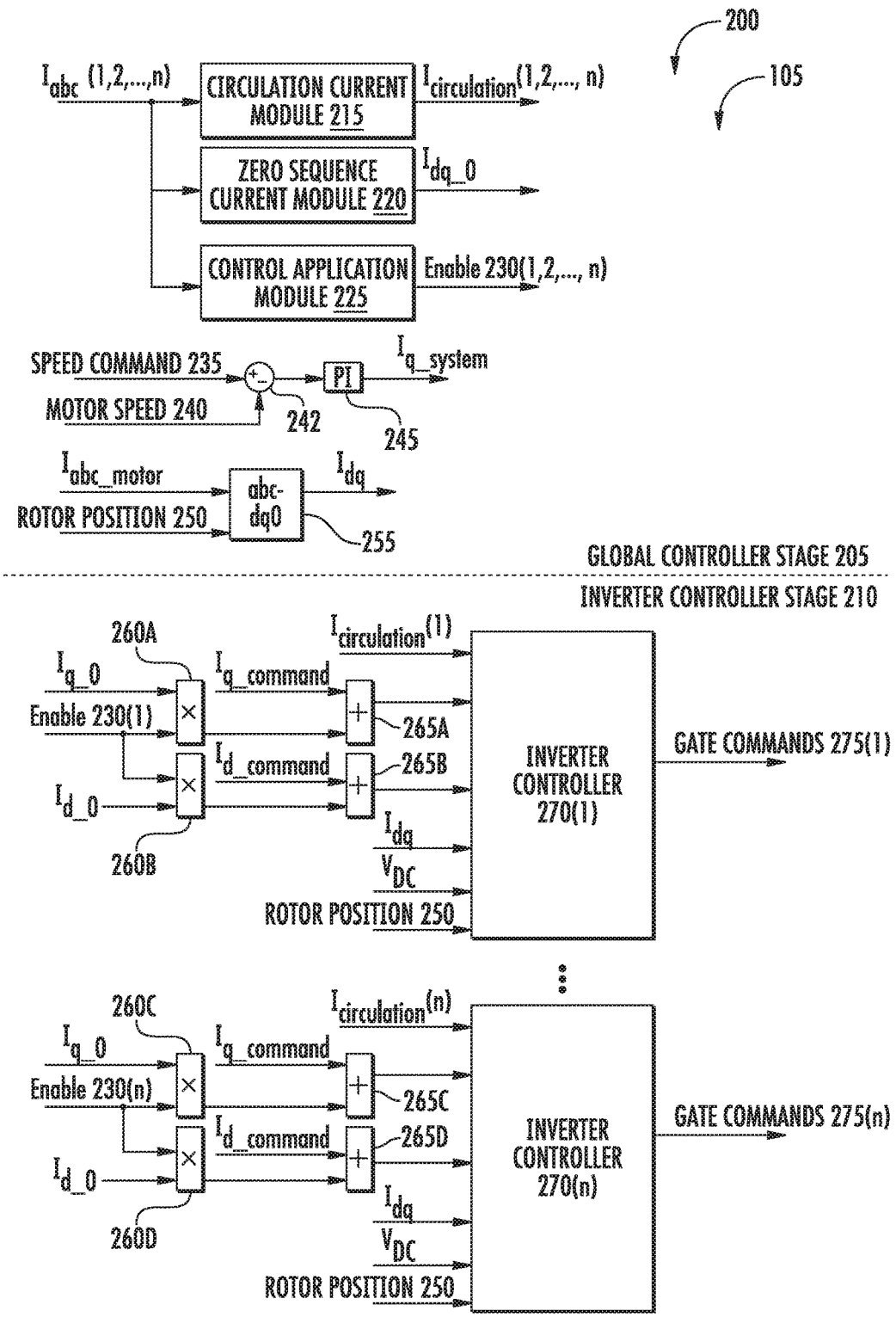
FIGS. 2 and 3 illustrate exemplary control architectures for mitigating a circulation current between power inverters of a modular converter system, according to one or more embodiments described herein.
Figure 3:
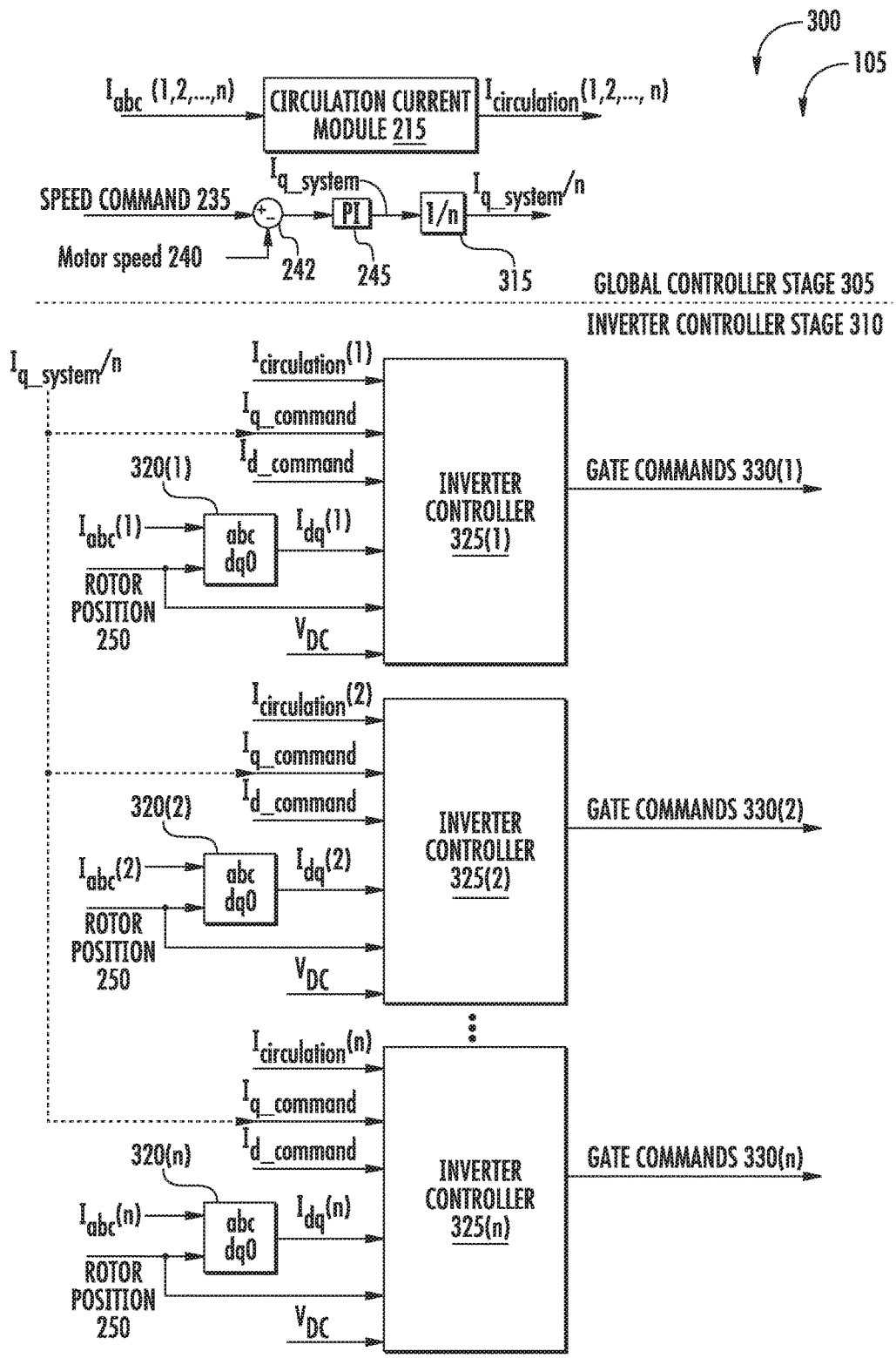

FIGS. 2 and 3 illustrate exemplary control architectures for mitigating a circulation current between power inverters of a modular converter system, according to embodiments described herein. Generally, architectures 200 and 300 represent example implementations of the system controller 105 of FIG. 1. Consistent with the discussion above, the system controller 105 may include further functionality such as receiving vehicle controller commands, interpreting the commands, determining the loads and power distribution, and generating signals for associated motor controllers. The various logic and modules illustrated in architectures 200, 300 may be implemented in hardware, firmware, and/or software.

The architecture 200 comprises a global controller stage 205 and inverter controller stage 210. The global controller stage 205 comprises a circulation current module 215 configured to receive the current amounts $I_{abc}$ (1, 2, ..., n) that are produced by the plurality of power inverters. The circulation current module 215 is further configured to compare various ones of the current amounts $I_{abc}$ (1, 2, ..., n) to determine whether a current imbalance exists between the power inverters.

In a modular system, some power inverters may have different electrical characteristics than others. For example, different electrical characteristics may occur due to operation of the inverter module over time, and/or replacing an inverter module (finding a substantially exact match may be unfeasible or impossible). The different electrical characteristics may cause an uneven current processing to occur between the power inverters. For example, a same commanded current for first and second power inverters may practically result in different current production by the first and second power inverters. The current imbalances arising from the different electrical properties may degrade performance and/or damage the power inverters.

In some embodiments, the circulation current module 215 is further configured to determine whether a circulation current $I_{circulation}$ (1, 2, ..., n) exists between at least two of the power inverters. Generally, a circulation current is produced by a power inverter and, instead of being delivered to load(s) associated with the power inverter, is circulated among one or more other power inverters that are arranged in parallel. The amount of power corresponding to the circulation currents can be considered "lost" power, as it is unavailable to power the associated load(s).

Therefore, minimizing circulation currents is generally beneficial to the efficient operation of a modular converter system. In some embodiments, minimizing circulation currents may further operate to mitigate one or more of a current imbalance within the power inverters, power losses of the power inverters, and electrical noise generated by the power inverters. In some embodiments, minimizing power losses from circulation currents permits lower-capacity inverter modules to be used, which can reduce a size and/or weight of the modular converter system.

The global controller stage 205 further includes a zero sequence current module 220 that is configured to calculate zero sequence current amounts, which are shown as $I_{dq\_0}$ but may alternately be represented as $I_{d\_0}$ and $I_{q\_0}$. The global controller stage 205 further includes a control application module 225 that is configured to determine based on the current amounts $I_{abc}$ (1, 2, ..., n) whether any current imbalances exist within the modular converter system, and to generate enable signals (Enable) 230 (1, 2, ..., n) to enable an offset control of selected power inverters using ones of the inverter controllers 270(1)-270(n).

The global controller stage 205 is further configured to receive a rotational speed command 235 at a sum block 242, as well as a measured motor rotational speed 240. The difference between the speed command 235 and motor speed 240 is input to a proportional-integral (PI) block 245, which outputs a total system current amount $I_{q\_system}$ for achieving the rotational speed command 235. While the speed command 235 and motor speed 240 relate to a motor's rotational speed, alternative embodiments may include any other suitable operational parameters and/or control signals relating to other types of loads. Further, alternate embodiments may include different types of feedback controllers, such as a proportional-integral-derivative (PID) block.

The global controller stage 205 is further configured to receive a motor current $I_{abc\_motor}$ and a measured rotor position 250 at a reference frame transformation module (abc-dq0) 255. The motor current $I_{abc\_motor}$ generally represents a stator current of the motor being controlled, and comprises the sum of the currents from paralleled power inverters (some or all of $I_{abc}$ (1, 2, . . . n)). The reference frame transformation module (abc-dq0) 255 is configured to determine current amounts $I_{dq}$, which may alternately be represented as $I_d$ and $I_q$. Within architecture 200, the reference frame transformation module 255 is included at the global level, and the resulting system-level current amounts $I_{dq}$ are input to each of the inverter controllers 270(1)-270(n).

Within the inverter controller stage 210, a plurality of inverter controllers 270(1), . . . , 270(n) are each configured to receive a circulation current $I_{circulation}$ (1, 2, . . . , n), the current amounts $I_{dq}$, the voltage $V_{DC}$ provided to the corresponding inverter module for powering the load, and rotor position 250. The inverter controllers 270(1)-270(n) are configured to generate gate commands 275(1)-275(n) to control the switching of the associated inverter modules. In some embodiments, the gate commands 275(1)-275(n) represent pulse-width modification (PWM) signals for switching elements of the associated power inverter. For example, each power inverter may comprise six transistors to generate three-phase power, in which case each gate commands 275(1), . . . , 275(n) comprises six signals for driving the gates of the six transistors.

As shown, the inverter controller stage 210 further includes multiplication blocks 260A-260D and sum blocks 265A-265D. Each inverter controller 270(1), . . . , 270(n) is further configured to receive signals comprising current commands $I_{q\_command}$ and $I_{d\_command}$. In some embodiments, the total system current amount $I_{q\_system}$ is input to each of the inverter controllers 270(1), . . . , 270(n) as current command $I_{q\_command}$. Generally, the values of $I_{d\_command}$ may vary based on the type of load being driven.

The exemplary operation of the inverter controller stage 210 will be described with respect to inverter controller 270(1), and the person of ordinary skill will understand these principles may be similarly applied to other inverter controllers 270. When the control application module 225 determines that no current imbalances exist within the modular converter system, or at least that no offset control is required for inverter controller 270(1), the value of the enable signal 230(1) may be set at a logical zero. As a result, the outputs of each of multiplication blocks 260A, 260B is zero. In turn, the sum blocks 265A, 265B respectively output values of $I_{q\_command}$ and $I_{d\_command}$ to the inverter controller 270(1). However, when the enable signal 230(1) is set at a logical one, meaning offset control is required for inverter controller 270(1), the $I_{q\_0}$ value is added to $I_{q\_command}$ at sum block 265A and $I_{d\_0}$ is added to $I_{d\_command}$ at sum block 265B. The outputs of sum blocks 265A, 265B are input to the inverter controller 270(1), which then adapts the gate commands 275(1) to mitigate the current imbalance.

FIG. 3 includes architecture 300 representing another example implementation of the system controller 105. Except where explicitly noted, elements in common with architecture 200 may be assumed to operate similarly.

The architecture 300 comprises a global controller stage 305 and inverter controller stage 310. The global controller stage 305 comprises a circulation current module 215 configured to determine whether a circulation current $I_{circulation}$ (1, 2, . . . , n) exists between at least two of the power inverters. In global controller stage 305, the total system current amount $I_{q\_system}$ is further processed through a division block 315, which is configured to evenly distribute portions of the total system current amount $I_{q\_system}$ among selected inverter controllers 325(1)-325(n). As shown, the division block 315 is configured to divide the total system current amount $I_{q\_system}$ by the number n of inverter controllers 325(1)-325(n), distributing a value of ($I_{q\_system}$/n) to each of the inverter controllers 325(1)-325(n). In other embodiments, the divisor of the division block 315 may be different than n, such as another integer representing a selected subset of the n inverter controllers 325(1)-325(n).

Within the inverter controller stage 310, a plurality of inverter controllers 325(1), . . . , 325(n) are each configured to receive a circulation current $I_{circulation}$ (1, 2, . . . , n), the voltage $V_{DC}$ provided to the corresponding inverter module for powering the load, and rotor position 250. As discussed above, the inverter controllers 325(1), . . . , 325(n) are configured to receive respective values of $I_{q\_command}$, which in some cases may be ($I_{q\_system}$/n) or other suitable values for an even distribution of the total system current amount $I_{q\_system}$. The inverter controllers 325(1)-325(n) are configured to generate gate commands 330(1)-330(n) to control the switching of the associated inverter modules. In some embodiments, the gate commands 330(1)-330(n) represent pulse-width modification (PWM) signals for switching elements of the associated power inverter.

The inverter controller stage 310 further includes a plurality of reference frame transformation modules (abc-dq0) 320(1), 320(2), . . . , 320(n). Each reference frame transformation module 320(1), 320(2), . . . , 320(n) is configured to receive a respective current amount $I_{abc}$ (1, 2, . . . , n) and the rotor position 250, and to determine respective current amounts $I_{dq}$ (1), $I_{dq}$ (2), . . . , $I_{dq}$ (n). Each current amount $I_{dq}$ (1), $I_{dq}$ (2), . . . , $I_{dq}$ (n) is input into a respective inverter controller 325(1), 325(2), . . . , 325(n).

The embodiment depicted in arrangement 300 provides several advantages over arrangement 200. The arrangement 300 does not require performing a zero sequence current calculation (i.e., zero sequence current module 220) or additional control application logic to determine whether to enable an offset control for the power inverters. Advantageously, mitigating an amount of zero sequence current improves efficient performance of the modular converter system, as more current generated by the power inverters can be delivered to the connected load.

Additionally, by including one reference frame transformation module 320(1), 320(2), . . . , 320(n) for each power inverter, the arrangement 300 forms one current loop for each power inverter. Providing individual current loops for each power inverter allows the corresponding inverter controller 325(1), 325(2), . . . , 325(n) to independently control the current amount that is provided to a particular load. With independent control, each inverter controller 325(1), 325(2), . . . , 325(n) is capable of mitigating current imbalances of the corresponding power inverter, as well as mitigating a severity of current control errors to avoid degradation and/or damage caused to the power inverter.

In some embodiments, independent control of each power inverter allows for normal operation of the modular converter system to continue despite multiple power inverters having distinct current imbalances. Current imbalances existing between the plurality of power inverters may occur due to variations in manufacturing of the power inverters, e.g., causing different impedances of the power inverters. In some embodiments, the power inverters of the modular converter system may be selected from different component batches, or one or more of the power inverters may be replaced. The power inverters may have any suitable parameters to describe the current imbalance, such as a gain parameter (e.g., representing a scaling of the current waveform) and/or an offset parameter (e.g., representing a biasing of the current waveform). Where the impedances of the power inverters do not match, the resulting current imbalance may cause relatively large current amounts to be produced by certain power inverter(s), which may damage the power inverter(s) or constantly trip an overcurrent protection of the power inverter(s).

Figure 4:
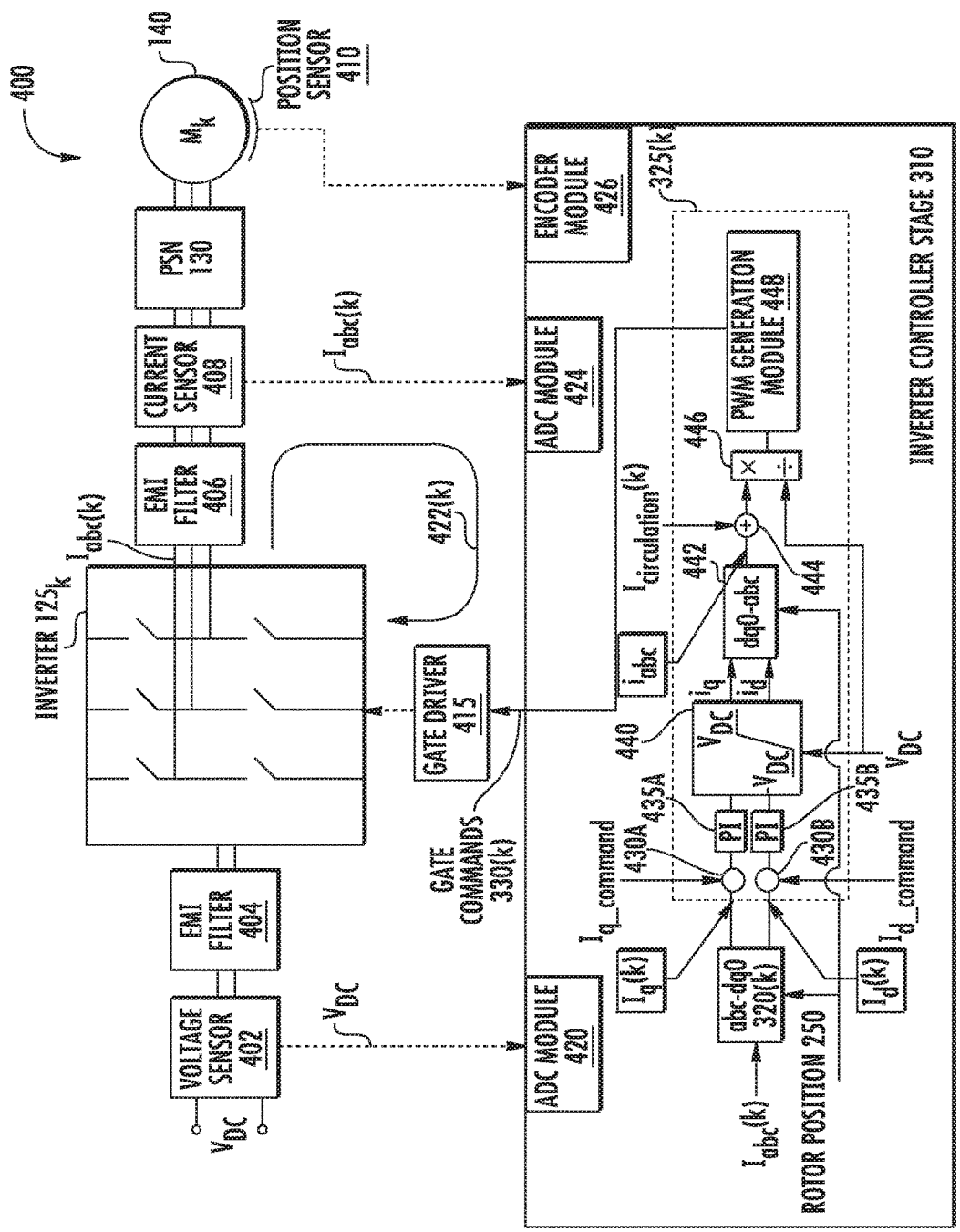
FIG. 4 illustrates a current balancing system for use within a parallel modular converter system, according to one or more embodiments described herein.

FIG. 4 illustrates a current balancing system for use within a parallel modular converter system, according to embodiments described herein. The current balancing system 400 represents one possible implementation of the inverter controller stage 310 of arrangement 300, and illustrates the independent control of one power inverter $125_k$ using one inverter controller 325($k$). The various logic and modules illustrated in balancing system 400 may be implemented in hardware, firmware, and/or software.

A DC voltage $V_{DC}$ is provided through an input electromagnetic interference (EMI) filter 404 to power the power inverter $125_k$. A voltage sensor 402 provides a value of $V_{DC}$ to an analog-to-digital converter (ADC) module 420, and the value of $V_{DC}$ is subsequently input to the inverter controller 325($k$).

Based on gate commands 330($k$), the gate driver 415 operates the switches of power inverter 125($k$) to produce a current amount $I_{abc}$ (k), which is filtered at an output EMI filter 406, and is directed through the power switching network 130 to a particular load such as motor $M_k$. A current sensor 408 provides a value of $I_{abc}$ (k) to an ADC module 424, which is subsequently input to the inverter controller 325($k$). A position sensor 410 provides a rotor position value to the encoder module 426, which is subsequently input to the inverter controller 325($k$) as rotor position 250.

The current amount $I_{abc}$ (k) and rotor position 250 are input to reference frame transformation modules (abc-dq0) 320($k$), which produces values of $I_q$ (k) and $I_d$ (k). Within the inverter controller 325($k$), sum block 430A compares $I_q$ (k) against the commanded current $I_{q\_command}$ and a difference is provided through a PI block 435A. The sum block 430B compares $I_d$ (k) against the commanded current $I_{d\_command}$ and a difference is provided through a PI block 435B. Saturation block 440 is configured to limit the output to within $\pm V_{DC}$, and produces the current amounts $i_q$ and $i_d$.

The current amounts $i_q$, $i_d$ and rotor position 250 are input to reference frame transformation modules (dq0-abc) 442, which output current values of $i_{abc}$. The $i_{abc}$ values are combined with the circulation current $I_{circulation}$ (k) in the sum block 444, the output of which is provided to multiplication block 446. The output of sum block 444 is divided by the DC voltage $V_{DC}$ and provided to the PWM generation module 448, which generates the gate commands 330($k$) for the gate driver 415. Thus, the current balancing system 400 forms a current loop 422($k$) for the inverter $125_k$.

In one exemplary embodiment, the system controller generates initial current commands (e.g., $I_{q\_command}$ and/or $I_{d\_command}$) such that a total system current amount is distributed evenly among the plurality of power inverters. For example, the current command $I_{q\_command}$ may be divided by the number n of power inverters and the amount ($I_{q\_command}$/n) delivered to each inverter controller 325($k$). After the corresponding gate commands 330($k$) are generated and applied to the power inverter $125_k$ to the gate driver 415, the system controller responsively determines a current amount $I_{abc}$(k) produced by the power inverter $125_k$. When a current imbalance is determined for at least one power inverter $125_k$ of the modular converter system, such as caused by a circulation current $I_{circulation}$ (k), the inverter controller 325($k$) adapts the subsequent gate commands 330($k$) to mitigate the current imbalance.

Figure 5:
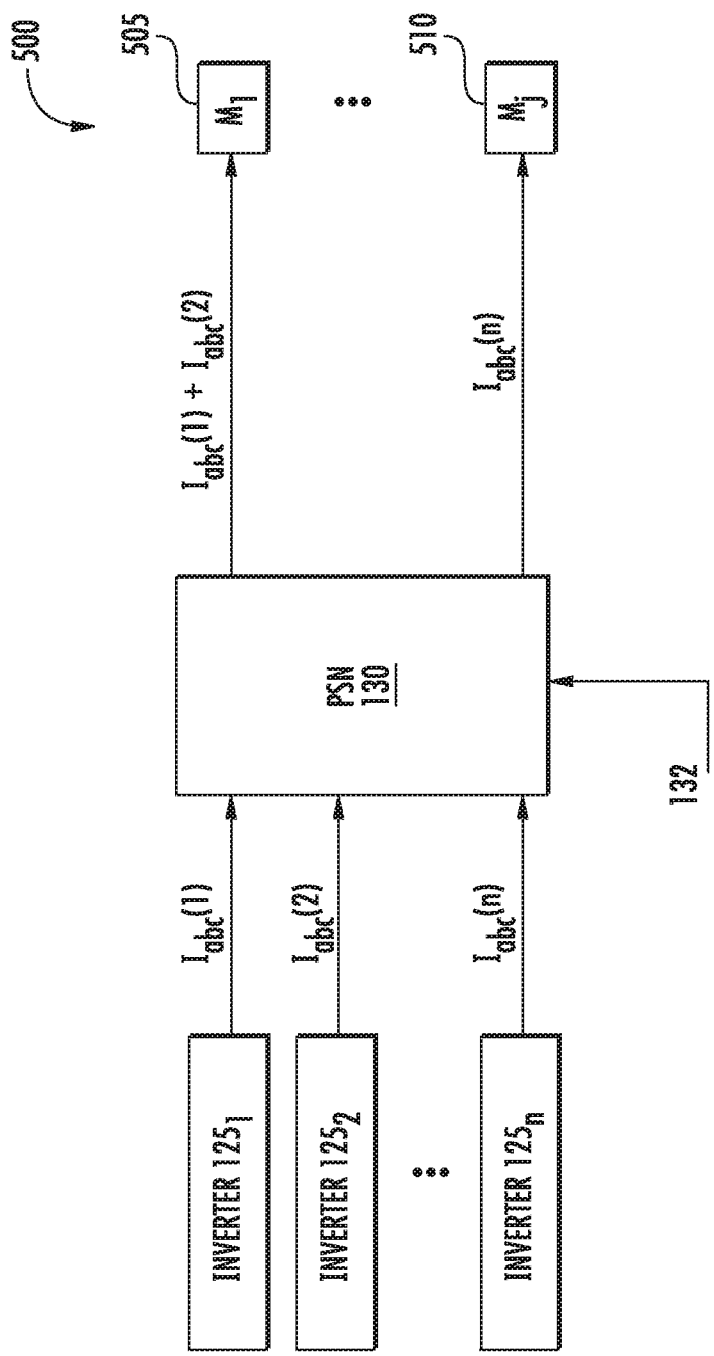
FIG. 5 illustrates an exemplary configuration in which multiple power inverters provide power to a common load, according to one or more embodiments described herein.

FIG. 5 illustrates an exemplary configuration in which multiple power inverters provide power to a common load, according to embodiments described herein. Arrangement 500 generally illustrates an example configuration of the modular converter system 100 of FIG. 1. In arrangement 500, power inverters $125_1$, $125_2$, . . . , $125_n$ each produce a respective current amount $I_{abc}$ (1), $I_{abc}$ (2), . . . , $I_{abc}$ (n) that is input to the power switching network (PSN) 130. Based on the PSN control signals 132, the power inverters $125_1$, $125_2$ are coupled with a common load 505 (i.e., motor $M_1$), which receives the sum of current amounts $I_{abc}$ (1), $I_{abc}$ (2). A second load 510 (i.e., motor $M_j$) is coupled with power inverter $125_n$ and receives current amount $I_{abc}$ (n). For simplicity of description, other power inverters and loads are not shown.

Figure 6:
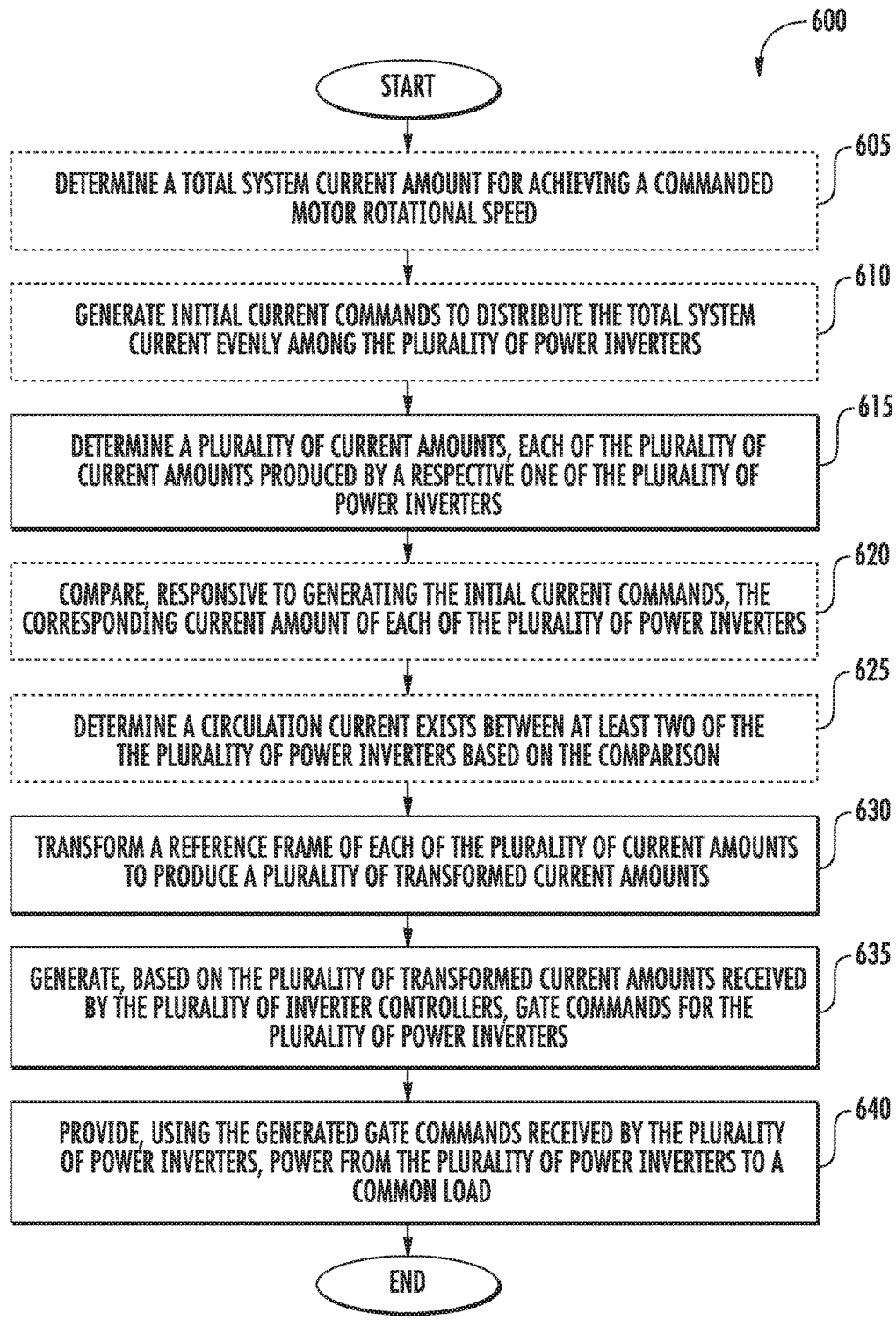
FIG. 6 illustrates a method of controlling current production of a plurality of power inverters controlled by a plurality of inverter controllers, according to one or more embodiments described herein.

FIG. 6 illustrates a method of controlling current production of a plurality of power inverters controlled by a plurality of inverter controllers, according to embodiments described herein. Method 600 is generally performed by a system controller associated with the modular converter system, such as according to architecture 300 of FIG. 3.

Method 600 begins at an optional block 605, where the system controller determines a total system current amount for achieving a commanded motor rotational speed. In an alternate embodiment, the load may be a different type than a motor, and the system controller determines a total system current amount based on meeting any other suitable operational parameters and/or control signals.

At an optional block 610, the system controller generates initial current commands to distribute the total system current amount evenly among the plurality of power inverters. In one embodiment, the total system current amount is divided by a number of power inverters that are arranged in parallel with a particular load, which in some cases may be less than the total number of power inverters included in the modular converter system. At block 615, the system controller determines a plurality of current amounts, where each of the plurality of current amounts is produced by a respective one of the plurality of power inverters.

At an optional block 620, the system controller compares, responsive to generating the initial current commands, the corresponding current amount of each of the plurality of power inverters. At an optional block 625, the system controller determines a current imbalance based on the comparison.

At block 630, the system controller transforms a reference frame of each of the plurality of current amounts to produce a plurality of transformed current amounts. In one embodiment, a reference frame transformation is performed for each power inverter, and is included within an individual current loop for each power inverter. The individual current loops allow the corresponding inverter controller to independently control the current amount that is provided to a particular load. With independent control, each inverter controller of the system controller is capable of mitigating current imbalances of the corresponding power inverter, as well as mitigating a severity of current control errors to avoid degradation and/or damage caused to the power inverter.

At block 635, the system controller generates, based on the plurality of transformed current amounts received by the plurality of inverter controllers, gate commands for the plurality of power inverters. At block 640, the system controller provides, using the generated gate commands received by the plurality of power inverters, power from the plurality of power inverters to a common load. Method 600 ends following completion of block 640.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A current balancing system comprising:
   a plurality of power inverters arranged in parallel, each power inverter included within a respective current loop and configured to generate a corresponding current amount; and
   a system controller comprising:
      a global controller stage configured to:
         generate current commands to evenly distribute, among the plurality of power inverters, a total system current amount to be provided; and
         determine, based on a comparison of current amounts generated by the plurality of power inverters responsive to the current commands, a circulation current existing between at least two of the plurality of power inverters; and
      a plurality of inverter controllers, wherein each inverter controller independently controls a respective power inverter of the plurality of power inverters, wherein each inverter controller is configured to:
         receive a reference frame-transformed amount of the current amount generated by the respective power inverter; and
         adjust the current amount generated by the respective power inverter using at least (1) the reference frame-transformed amount and (2) the circulation current,
         wherein adjusting the current amount operates to mitigate the circulation current.

2. The system of claim 1, wherein at least a first power inverter of the plurality of power inverters has different electrical characteristics than at least a second power inverter of the plurality of power inverters, wherein a same commanded current amount provided to the first power inverter and to the second power inverter results in an uneven current processing among the plurality of power inverters.

3. The system of claim 1, wherein adjusting the current amount further operates to mitigate one or more of:
   a current imbalance within the plurality of power inverters;
   power losses of the plurality of power inverters; and
   electrical noise generated by the plurality of power inverters.

4. The system of claim 1, wherein at least two of the plurality of power inverters provide power to a common load.

5. The system of claim 4, wherein the common load comprises a motor.

6. The system of claim 1, wherein the global controller stage is further configured to:
   determine the total system current amount for achieving a commanded motor rotational speed.

7. A method of controlling current production of a plurality of power inverters arranged in parallel, wherein each power inverter is independently controlled by a respective inverter controller of a plurality of inverter controllers, the method comprising:
   generating, at a global controller stage, current commands to evenly distribute, among the plurality of power inverters, a total system current amount to be provided;
   determining a plurality of current amounts generated by the plurality of power inverters responsive to the current commands;
   determining, based on a comparison of the plurality of current amounts, a circulation current existing between at least two of the plurality of power inverters;
   transforming a reference frame of each of the plurality of current amounts to produce a plurality of transformed current amounts; and
   adjusting, using the plurality of inverter controllers, one or more of the current amounts generated by the respective power inverters using at least (1) the plurality of transformed current amounts and (2) the circulation current,
   wherein adjusting the one or more of the current amounts operates to mitigate the circulation current.

8. The method of claim 7, wherein adjusting the one or more of the current amounts further operates to mitigate one or more of:
   power losses of the plurality of power inverters;
   electrical noise generated by the plurality of power inverters; and
   a current imbalance between at least two of the plurality of power inverters.

9. The method of claim 7, wherein at least a first power inverter of the plurality of power inverters has different electrical characteristics than at least a second power inverter of the plurality of power inverters, wherein a same commanded current amount provided to the first power inverter and to the second power inverter results in an uneven current processing among the plurality of power inverters.

10. The method of claim 7, further comprising:
    determining the total system current amount for achieving a commanded motor rotational speed.

11. The method of claim 7, further comprising:
    providing power from the plurality of power inverters to a common load.

12. The method of claim 11, wherein the common load comprises a motor.

13. A non-transitory computer-readable medium comprising computer program code that, when executed by operation of one or more computer processors, performs an operation of controlling current production of a plurality of power inverters arranged in parallel, wherein each power inverter is independently controlled by a respective inverter controller of a plurality of inverter controllers, the operation comprising:
    generating current commands to evenly distribute, among the plurality of power inverters, a total system current amount to be provided;
    determining a plurality of current amounts generated by the plurality of power inverters responsive to the current commands;
    determining, based on a comparison of the plurality of current amounts, a circulation current existing between at least two of the plurality of power inverters;
    transforming a reference frame of each of the plurality of current amounts to produce a plurality of transformed current amounts; and adjusting, using the plurality of inverter controllers, one or more of the current amounts generated by the respective power inverters using at least (1) the plurality of transformed current amounts and (2) the circulation current, wherein adjusting the one or more of the current amounts operates to mitigate the circulation current.

14. The computer-readable medium of claim 13, wherein adjusting the one or more of the current amounts further operates to mitigate one or more of:

power losses of the plurality of power inverters;

electrical noise generated by the plurality of power inverters; and a current imbalance between at least two of the plurality of power inverters.

15. The computer-readable medium of claim 13, the operation further comprising:

determining the total system current amount for achieving a commanded motor rotational speed.

16. The computer-readable medium of claim 13, the operation further comprising:

providing power from the plurality of power inverters to a common load (505).

17. The computer-readable medium of claim 16, wherein the common load comprises a motor.

18. The computer-readable medium of claim 13, wherein the one or more computer processors are included in a global controller stage.

19. The system of claim 5, wherein the motor is included in an aircraft.

20. The system of claim 19, wherein the motor has a first load priority factor greater than a second load priority factor of another load.

* * * * *

UNITED STATES PATENT AND TRADEMARK OFFICE
CERTIFICATE OF CORRECTION

PATENT NO. : 10,454,393 B2
APPLICATION NO. : 15/219028
DATED : October 22, 2019
INVENTOR(S) : Darren Lee Paschedag et al.

It is certified that error appears in the above-identified patent and that said Letters Patent is hereby corrected as shown below:

In the Specification

In Column 1, Line 10, delete "Architecture"," and insert -- Architecture" (which has since issued as U.S. Pat. No. 10,079,493 on Sep. 18, 2018), --, therefor.

In Column 1, Line 12, delete "Converters"," and insert -- Converters" (which has since issued as U.S. Pat. No. 9,647,455 on May 9, 2017), --, therefor.

In Column 1, Line 15, delete "System"." and insert -- System" (which has since issued as U.S. Pat. No. 9,911,719 on Jun. 5, 2018). --, therefor.

In the Claims

In Column 18, Line 6, in Claim 16, delete "load (505)." and insert -- load. --, therefor.

Signed and Sealed this
Eighteenth Day of February, 2020

Andrei Iancu
*Director of the United States Patent and Trademark Office*